United States Patent
Koskela et al.

(10) Patent No.: US 11,569,889 B2
(45) Date of Patent: Jan. 31, 2023

(54) USER EQUIPMENT RECEIVER SPATIAL FILTER CONFIGURATION DURING SECONDARY CELL BEAM FAILURE RECOVERY

(71) Applicant: Nokia Technologies Oy, Espoo (FI)

(72) Inventors: Timo Koskela, Oulu (FI); Samuli Turtinen, Ii (FI); Jorma Kaikkonen, Oulu (FI); Mihai Enescu, Espoo (FI); Sami Hakola, Kempele (FI); Juha Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/978,782

(22) PCT Filed: Mar. 7, 2019

(86) PCT No.: PCT/FI2019/050180
§ 371 (c)(1),
(2) Date: Sep. 8, 2020

(87) PCT Pub. No.: WO2019/193239
PCT Pub. Date: Oct. 10, 2019

(65) Prior Publication Data
US 2020/0403682 A1     Dec. 24, 2020

Related U.S. Application Data

(60) Provisional application No. 62/653,001, filed on Apr. 5, 2018.

(51) Int. Cl.
*H04W 72/04* (2009.01)
*H04B 7/06* (2006.01)
(Continued)

(52) U.S. Cl.
CPC ......... *H04B 7/0695* (2013.01); *H04B 7/0626* (2013.01); *H04L 5/0051* (2013.01);
(Continued)

(58) Field of Classification Search
CPC ...... H04B 7/0695; H04B 7/0626; H04B 7/06; H04B 7/0408; H04B 7/0617;
(Continued)

(56) References Cited

U.S. PATENT DOCUMENTS 10,863,570 B2 * 12/2020 Cirik ................... H04B 7/088
2018/0054832 A1 * 2/2018 Luo ..................... H04W 72/08
(Continued)

OTHER PUBLICATIONS

MediaTek Inc. R1-1803441 Summary 2 on Remaining issues on Beam Failure Recovery, Feb. 26-Mar. 2, 2018 (Year: 2018).*
(Continued)

*Primary Examiner* — Mahbubul Bar Chowdhury
(74) *Attorney, Agent, or Firm* — Squire Patton Boggs (US) LLP

(57) ABSTRACT

Systems, methods, apparatuses, and computer program products for beam failure recovery are provided. Beam failure recovery may include detecting and/or declaring, by a user equipment, UE, secondary cell, Scell, beam failure at MAC layer and e.g. determining and/or selecting CSI-RS and/or SSB indexes for transmission to a network node.

10 Claims, 4 Drawing Sheets

(51) Int. Cl.
  *H04W 76/19* (2018.01)
  *H04L 5/00* (2006.01)
  *H04L 5/10* (2006.01)
  *H04W 56/00* (2009.01)
  *H04W 80/02* (2009.01)
(52) U.S. Cl.
  CPC ............. *H04L 5/10* (2013.01); *H04W 56/001* (2013.01); *H04W 72/042* (2013.01); *H04W 76/19* (2018.02); *H04W 80/02* (2013.01)
(58) Field of Classification Search
  CPC ..... H04B 7/0697; H04B 17/24; H04W 76/19; H04W 56/001; H04W 72/042; H04W 80/02; H04W 36/30; H04W 16/28; H04W 36/00; H04W 48/10; H04L 5/0051; H04L 5/10; H04L 5/0048; H04J 11/0069
  See application file for complete search history.

(56) References Cited

U.S. PATENT DOCUMENTS

| | | | | |
|---|---|---|---|---|
| 2019/0190582 | A1* | 6/2019 | Guo | H04W 76/19 |
| 2019/0215712 | A1* | 7/2019 | Babaei | H04L 5/0092 |
| 2019/0253986 | A1* | 8/2019 | Jeon | H04W 72/042 |
| 2020/0374960 | A1* | 11/2020 | Deenoo | H04W 72/14 |
| 2021/0058129 | A1* | 2/2021 | Takeda | H04W 28/0278 |
| 2021/0058130 | A1* | 2/2021 | Zhu | H04L 5/0023 |
| 2021/0068162 | A1* | 3/2021 | Agiwal | H04L 41/0668 |
| 2021/0084623 | A1* | 3/2021 | Zhang | H04L 5/0048 |

OTHER PUBLICATIONS

Huawei, R1-1801454 Remaining issues on beam failure recovery, Feb. 26-Mar. 2, 2018 (Year: 2018).*
"3rd Generation Partnership Project; Technical Specification Group Radio Access Network; NR; Physical layer procedures for control (Release 15)", 3GPP TS 38.213, V15.0.0 , Dec. 2017, pp. 1-56.
"3rd Generation Partnership Project; Technical Specification Group Radio Access Network; NR; Medium Access Control (MAC) protocol specification (Release 15)", 3GPP TS 38.321 V15.0.0, Dec. 2017, pp. 1-55.
"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.
International Search Report and Written Opinion received for corresponding Patent Cooperation Treaty Application No. PCT/FI2019/050180, dated Jun. 13, 2019, 16 pages.
"Remaining Issues on Beam Failure Recovery", 3GPP TSG RAN WG1 Meeting #92, R1-1801454, Agenda: 7.1.2.2.4, Huawei, Feb. 26-Mar. 2, 2018, 8 pages.
"Beam failure recovery for SCell", 3GPP TSG-RAN WG2#101, R2-1801814, Agenda: 10.3.1.13, Huawei, Feb. 26-Mar. 2, 2018, 2 pages.
"Beam Failure Detection", 3GPP TSG-RAN WG2#101, R2-1802142, Agenda: 10.3.1.4.2, CATT, Feb. 26-Mar. 2, 2018, pp. 1-4.
Office Action issued in corresponding Japanese Patent Application No. 2020-552355 dated Nov. 9, 2021, with English translation thereof.
MediaTek Inc., "Clarifications on Beam Failure Recovery Procedure", 3GPP TSG RAN WG2 #101, R2-1802406, Feb. 16, 2018.
Extended European Search Report issued in corresponding European Patent Application No. 19782379.2 dated Jan. 4, 2022.
Huawei et al., "General consideration on RA procedure for beam failure recovery", 3GPP Draft, 3GPP TSG-RAN2 Meeting #AH-1801, R2-1801009, Jan. 12, 2018, Retrieved from the Internet: URL:http://www.3gpp.org/ftp/tsg%5Fran/WG2%5FRL2/TSGR2%5FAHs/2018%5F01%5FNR/Docs/.
Huawei et al., "RAN2 aspects of DL beam management", 3GPP Draft, 3GPP TSG-RAN WG2#99bis, R2-1710562, Oct. 8, 2017, Retrieved from the Internet: URL:http://www.3gpp.org/ftp/Meetings_3GPP_SYNC/RAN2/Docs/.
Qualcomm Incorporated: "Beam recovery procedures", 3GPP Draft; 3GPP TSG RAN WG1 Meeting #92, R1-1802824, Feb. 17, 2018, Retrieved from the Internet: URL:http://www.3gpp.org/ftp/tsg%5Fran/WG1%5FRL1/TSGR1%5F92/Docs/.
Catt et al., "WF on Beam Failure Recovery in CA", 3GPP Draft; R1-1803367, Feb. 28, 2018, Retrieved from the Internet: URL:http://www.3gpp.org/ftp/tsg%5Fran/WG1%5FRL1/TSGR1%5F92/Docs/.
Japanese Office Action issued in corresponding Japanese Patent Application No. 2020-552355 dated Mar. 24, 2022, with English summary thereof.
First Examination Report issued in corresponding Indian Patent Application No. 202047047995 dated Feb. 14, 2022.

* cited by examiner

USER EQUIPMENT RECEIVER SPATIAL FILTER CONFIGURATION DURING SECONDARY CELL BEAM FAILURE RECOVERY

RELATED APPLICATION

This application was originally filed as PCT Application No. PCT/FI2019/050180 on Mar. 7, 2019, which claims priority from U.S. Application No. 62/653,001 filed Apr. 5, 2018, which is hereby incorporated in its entirety.

CROSS-REFERENCE TO RELATED APPLICATIONS

This application claims priority from U.S. provisional patent application No. 62/653,001 filed on Apr. 5, 2018. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology. For example, certain embodiments may relate to beam failure recovery in such communication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method that may include detecting and/or declaring, by a UE, SCell beam failure at MAC layer. In an embodiment, the method may also include requesting and/or receiving candidate beam measurements from the physical layer (L1) for the failed SCell. According to one embodiment, the method may further include determining and/or selecting a reported set of CSI-RS and/or SSB indexes in SCell BFR MAC CE according to the network configuration (i.e., N-highest). The method may then include generating and/or transmitting a SCell BFR MAC CE, and determining when the MAC CE has been successfully transmitted.

In certain embodiments, the method may also include indicating, by the UE, physical layer of at least one reported resource in the SCell BFR MAC CE, where the indication is based on certain selection criteria according to indicated candidates. In an embodiment, if the UE has indicated N-candidates (SSB/CSI-RS), the indicating may include setting the spatial Rx filter with assumption that the PDCCH DMRS of SCell are QCLed with the indicated DL RS with highest reported reporting quantity (e.g., RSRP, RSRQ etc.). In another embodiment, if the UE has indicated only CSI-RS resources as new candidates, the indicating may include setting the spatial Rx filter according to the highest reported CSI-RS. In yet another embodiment, if the UE has indicated both CSI-RS and SSB as new candidates, the indicating may include setting the spatial Rx filter assuming highest reported SSB due to link robustness.

According to one example embodiment, the setting of the spatial Rx filter may take into account the PDCCH TCI state table entries. For example, if the UE has indicated only CSI-RS as new candidates and at least one CSI-RS resource is currently configured as TCI state but is not active, the setting may include setting the spatial Rx filter according to the highest reported non-active TCI state. In another example embodiment, if the UE has indicated only SSB resources as new candidates, the setting may include setting the spatial Rx filter according to the highest reported SSB. In yet another example, if the UE has indicated only SSBs as new candidates and at least one CSI-RS resource is currently configured as TCI state but is not active, the setting may include setting the spatial Rx filter according to the highest reported non-active TCI state. In another embodiment, if a default TCI state has been defined for each TCI table and one of the indicated candidates is the said default TCI state, UE assumes the spatial RX filter according to that.

In another example embodiment, if the UE is capable of operating with multiple panels and multiple TXRUs per serving cell/SCell, the setting may include selecting, for example, the spatial Rx filter with PDCCH DMRS QCL assumption according to M highest DL RS based on reporting quantity. In another embodiment, if more than one SS block and more than one CSI-RS were indicated or more than one SS block and at least one CSI-RS or at least one SS Block and one CSI-RS were indicated, the selecting may include selecting at least one SS Block and at least one CSI-RS if the M>=2.

Another embodiment is directed to an apparatus that may include at least one processor and at least one memory comprising computer program code. The at least one memory and computer program code may be configured, with the at least one processor, to cause the apparatus at least to detect and/or declare SCell beam failure at MAC layer. In an embodiment, the at least one memory and computer program code may be configured, with the at least one processor, to cause the apparatus at least to request and/or receive candidate beam measurements from the physical layer (L1) for the failed SCell. According to one embodiment, the at least one memory and computer program code may be configured, with the at least one processor, to cause the apparatus at least to determine and/or select a reported set of CSI-RS and/or SSB indexes in SCell BFR MAC CE according to the network configuration (i.e., N-highest). The at least one memory and computer program code may also be configured, with the at least one processor, to cause the apparatus at least to generate and/or transmit a SCell BFR MAC CE, and determine when the MAC CE has been successfully transmitted. In certain embodiments, the at least one memory and computer program code may be configured, with the at least one processor, to cause the apparatus at least to indicate physical layer of at least one reported resource in the SCell BFR MAC CE, where the indication is based on certain selection criteria according to indicated candidates.

Another embodiment is directed to an apparatus that may include means for detecting and/or declaring SCell beam failure at MAC layer. In an embodiment, the apparatus may also include means for requesting and/or receiving candidate beam measurements from the physical layer (L1) for the failed SCell. According to one embodiment, the apparatus may further include means for determining and/or selecting a reported set of CSI-RS and/or SSB indexes in SCell BFR MAC CE according to the network configuration (i.e., N-highest). The apparatus may then include means for generating and/or transmitting a SCell BFR MAC CE, and means for determining when the MAC CE has been successfully transmitted. In certain embodiments, the apparatus may also include means for indicating physical layer of at least one reported resource in the SCell BFR MAC CE, where the indication is based on certain selection criteria according to indicated candidates.

Another embodiment is directed to a method that may include receiving, by a network node, an indication of SCell beam failure indication or alternatively a MAC CE indicating new candidate resources of failed SCell. Upon receiving the SCell BFR MAC CE, the method may include running the same selection logic as the UE for the resource selection to determine UE spatial receiver filter assumption for receiving a response for the BFR on SCell (TCI state configuration). The method may then include selecting PCell or SCell for transmitting the new TCI state configuration/activation.

Another embodiment is directed to an apparatus that may include at least one processor and at least one memory comprising computer program code. The at least one memory and computer program code may be configured, with the at least one processor, to cause the apparatus at least to receive an indication of SCell beam failure indication or alternatively a MAC CE indicating new candidate resources of failed SCell. Upon receiving the SCell BFR MAC CE, the at least one memory and computer program code may be configured, with the at least one processor, to cause the apparatus at least to run the same selection logic as the UE for the resource selection to determine UE spatial receiver filter assumption for receiving a response for the BFR on SCell (TCI state configuration). The at least one memory and computer program code may also be configured, with the at least one processor, to cause the apparatus at least to select PCell or SCell for transmitting the new TCI state configuration/activation.

Another embodiment is directed to an apparatus that may include means for receiving an indication of SCell beam failure indication or alternatively a MAC CE indicating new candidate resources of failed SCell. Upon receiving the SCell BFR MAC CE, the apparatus may include means for running the same selection logic as the UE for the resource selection to determine UE spatial receiver filter assumption for receiving a response for the BFR on SCell (TCI state configuration). The apparatus may then include means for selecting PCell or SCell for transmitting the new TCI state configuration/activation.

BRIEF DESCRIPTION OF THE DRAWINGS

For proper understanding of example embodiments, reference should be made to the accompanying drawings, wherein.

DETAILED DESCRIPTION

Figure 1:
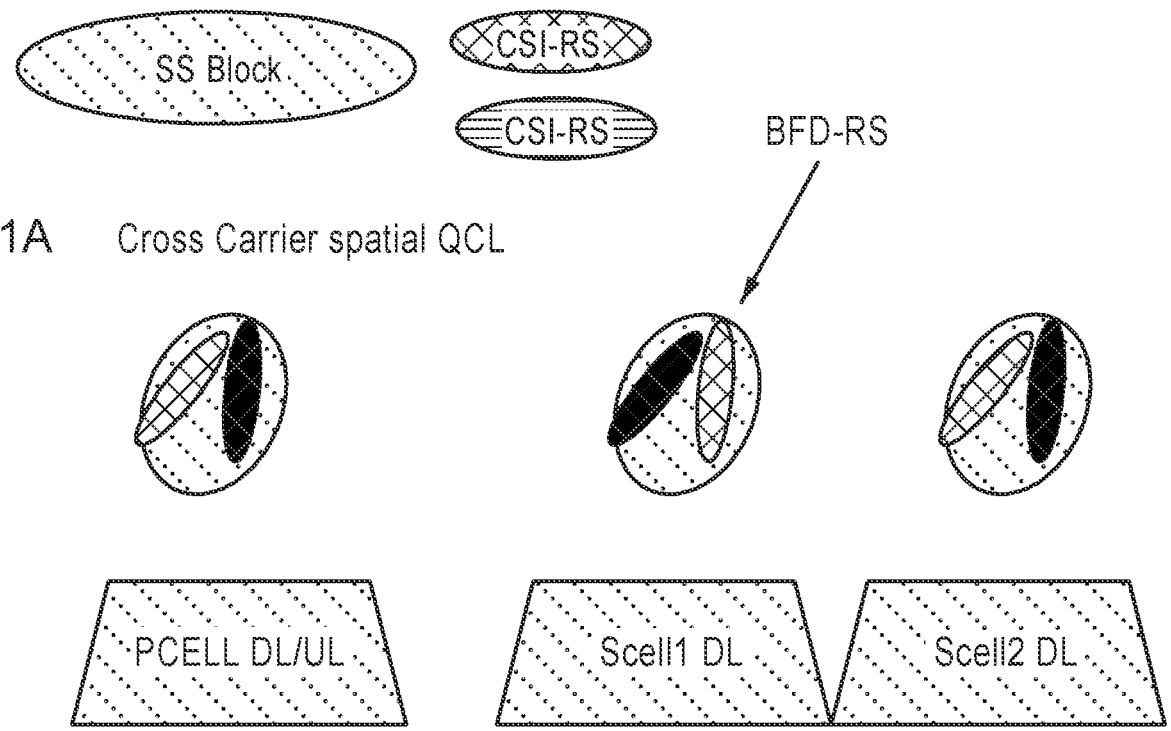
FIG. 1 illustrates an example diagram depicting the scenario of spatial and non spatial QCL assumption of reference signals across carriers, according to an example.
Figure 1:
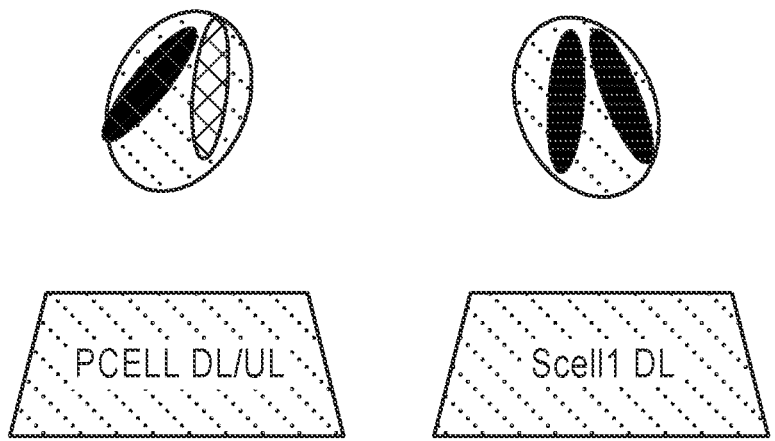

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam failure recovery, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Currently, in $3^{rd}$ generation partnership project (3GPP), a beam failure recovery (BFR) procedure is specified to recover the link connection. An aim of the beam recovery is to detect when one or multiple serving control channels, such as physical downlink control channel (PDCCH), links is/are considered to be in failure conditions and recovery of the link is needed. To recover the link, a UE may initiate signaling towards the network to indicate link failure and new potential link, a candidate link. As a response to requested candidate link, the network may configure the UE with a new PDCCH link. It is noted that beam recovery may also be referred to as link reconfiguration and is specified in 3GPP in technical specifications TS 38.213, 38.321 and 38.331.

A network can configure a UE with a set of reference signals (RS) for monitoring the quality of a link. This set may be referred to as q0 or beam failure detection RS (BFD-RS). Typically, BFD-RS may be configured in a manner that these signals are spatially quasi co-located (QCLed) with PDCCH demodulation reference signals (DMRS), i.e., these reference signals correspond to downlink beams used to transmit PDCCH. Downlink beams may be identified by reference signal, for example, either synchronization signal (SS)/physical broadcast channel (PBCH) block index or channel state information reference signals (CSI-RS) resource index. The network may configure the BFD-RS list using radio resource control (RRC) signaling. It may also be possible to define a way to use combined RRC and medium access control (MAC) control element (CE) signaling to first configure with RRC and then indicate specific resource or set of resource using MAC CE.

When a UE is not explicitly configured with a BFD-RS list, the UE may determine the BFD-RS resources implicitly based on the configured/indicated/activated PDCCH-transmission configuration indication (TCI) states per control resource set (CORESET), i.e., the downlink reference signals (CSI-RS, SS/PBCH block) that are spatially QCLed with PDCCH DMRS or, in other words, PDCCH beams.

The physical layer may assess the quality of the radio link periodically (e.g., based on BFD-RS in set of q0). An assessment may be done per BFD-RS and, when the radio link condition of each BFD-RS in the beam failure detection set is considered to be in failure condition, i.e., the hypothetical PDCCH block error ratio (BLER) estimated using the RS is above a configured threshold, a beam failure instance (BFI) indication may be provided to higher layer (e.g., MAC layer). One example of BLER value may be the out-of-sync (OOS) threshold used for radio link monitoring, OOS/Qout=10%. The evaluation and indication may be performed periodically. In case at least one BFD-RS is not in failure condition, no indication is provided to the higher layer. In other words, under this approach, all links need to fail in order to declare beam failure.

The MAC layer may implement a counter to count the BFI indications from the layer and, if the BFI counter reaches maximum value (configured by the network), a beam failure is declared. This counter can be configured to be supervised by a timer, e.g., each time MAC receives a BFI indication from lower layer a timer is started. Once the timer expires, the BFI counter is reset (i.e., counter value is set to zero). Alternatively, a timer may also be configured to supervise the beam failure recovery procedure. The timer may be started upon detecting beam failure and, when the timer expires, the UE declares the beam failure recovery to be unsuccessful. While the timer is running, the UE may try to recover the link.

When a beam failure is declared and a UE has detected new candidate beam or beams based on layer 1 (L1) measurements (e.g., L1-RSRP), candidate beam L1-reference signal received power (RSRP) measurements may be provided to MAC layer, which may perform the selection of new candidate(s) and determine the uplink (UL) resources to indicate the new candidate to the network. The network may configure the UE with dedicated signaling resources (e.g., physical random access channel (PRACH) resources) that are candidate beam specific, and the UE can indicate a new candidate by sending a preamble.

If a UE has declared beam failure and a new candidate beam exists, the network may provide the UE with a list of candidate RSs for recovery that may be indicated using a dedicated signal. A dedicated signal (e.g., from the PRACH preamble signal resource set) can be referred contention free random access (CFRA) resources as well, but the beam recovery procedure may differ slightly from CFRA procedure in terms of gNB response when a candidate RS in the Candidate-Beam-RS-List is indicated. A specific threshold may be configured so that if any of the new candidates (based on L1-RSRP measurements) are above the threshold that can be indicated using dedicated signal (can be referred also as set of resources in set q1), the UE may select a candidate among that set. Otherwise, the UE may utilize contention based signaling to indicate a new candidate (contention based random access (CBRA) preamble resources are mapped to specific downlink RS such as SS/PBCH block and/or CSI-RS).

A UE may monitor the network response to BFRR (or BFRQ, Beam Failure Recovery Request) during the beam recovery response window (e.g., which may be similar to random access response window) using the same beam alignment (same beam direction that was used for transmitting the recovery signal (TX) is used for receiving (RX)) the network response (gNB response); the UE expects the network to provide a response using a beam that is spatially QCLed with the indicated downlink reference signal. A case where this correspondence does not hold is not yet defined. In case of contention free signaling used for beam recovery purposes, the UE expects the network to respond to the UE using cell radio network temporary identity (C-RNTI) instead of random access radio network temporary identity (RA-RNTI) when CFRA procedure for beam failure recovery is used. In case CBRA resources are used for recovery, the UE expects response as normally in RA procedure.

Currently, the BFR or link reconfiguration procedure can be applied to a serving cell but the procedure does not differentiate between the primary cell (Pcell) and secondary cell (Scell) (carrier aggregation case). As an example, BFR can be applied to a case where the Scell also has a corresponding UL carrier. As an example, if the SCell has corresponding UL carrier with CBRACH (CFRA may be also be configured) configuration the current BFR/link reconfiguration procedures may be applied directly.

FIG. 1 illustrates an example diagram depicting the scenario of spatial and non spatial QCL assumption of reference signals (CSI-RS, SS/PBCH block) across component carriers. It should be noted that although FIG. 1 illustrates the SCells as DL only, also uplink i.e. PUCCH (Physical Uplink Control Channel) may be mapped to SCell. Thus, FIG. 1 illustrates only one possible example of configuration of component carriers, and other examples are also possible according to other embodiments. Additionally, it is noted that PCell may also refer to PSCell in case of dual connectivity. In the case where the cross carrier spatial QCL (1A) is valid for PCell and SCell (or multiple of SCells) BFD-RS resources (CSI-RS, SS/PBCH block), the beam failure can be detected on PCell and it implicitly means that all the SCell(s) are in the beam failure condition due to spatial QCL assumption of the reference signals used for assessing the link quality. In the case where the spatial QCL assumption for BFD-RS does not hold across the carriers (1B), the UE needs to be able to detect beam failure and perform recovery for each serving cell separately.

As an example, scenario 1B may occur, for example, when PCell is located in frequency range 1 (FR1) (i.e., below 6 GHz) and SCell is configured to be downlink (DL) only on frequency range 2 (FR2) (i.e., above 6 GHz). Alternatively, scenario 1B may occur where both PCell and SCell may operate on same FR but due to the PDCCH TCI configuration (which is cell specific) the BFD-RS detection resources may be different, i.e., there may not be correspondence between PCell and SCell failure. Moreover, when there is no uplink carrier for the SCell, the current ways to recover from beam failure may not be applied directly and they may not even be desirable.

Thus, some example embodiments may relate to scenario 1B illustrated in FIG. 1 in which the SCell beam failure has been detected while the PCell is in a non-failure condition, i.e., it has an uplink available. In this scenario, the SCell has no uplink and the uplink control signaling is sent on the PCell. Since the uplink of the PCell is available upon detecting beam failure and new candidate beams on SCell, the UE triggers beam failure recovery signaling on the PCell.

Similarly as with the PCell, one potential way to recover the SCell, upon beam failure, may be to configure candidate beam specific uplink signals (CFRA) of the SCell on the PCell and indicate the SCell candidate beam on the PCell.

An alternative approach to recover the SCell may be to use a MAC based solution where the SCell candidate beam or beams could be indicated with a specific MAC CE transmitted on the PCell. In a MAC layer solution, the UE may potentially indicate multiple candidates. The MAC CE may include beam index or SS/PBCH block index and CSI-RS resource index and optionally the measurement reporting quantity, such as RSRP, RSRQ, SINR, hypothetical PDCCH BLER, etc. Currently, NR supports the candidate selection based on L1-RSRP measurement and the provision of L1-RSRP measurements from PHY to MAC.

More specifically, a problem may arise in UE RX beam alignment or, in other words, the QCL assumption for the SCell PDCCH reception when SCell beam failure has occurred, new candidate beams exist and the UE has indicated new candidate beam or beams using PCell (or in a more general view a serving cell with working uplink, i.e., SCell with corresponding UL carrier).

As one example solution, all the network side recovery signaling may be handled using the PCell, while the UE does not try to receive anything on the SCell downlink (i.e., no specific RX beam alignment is assumed by UE) or just maintains the old RX alignment that corresponds to the failed PDCCH until a new one is activated. However, such operation may not be desirable from a latency perspective considering potential antenna panel activation delays at the UE side, TCI table configuration via RRC and activation via MAC CE. For power saving purposes, the UE may switch off the panels with the principle that the UE is always having at least one panel active at a time. The UE may switch ON the panel for measurements and, when the gNB configures the UE with a transmit beam, requiring the panel used to measure the transmit beam transmissions in measurement phase. Presently, it is under discussion in 3GPP that a UE may operate with a subset of antenna panels active and it may take several milliseconds to switch/activate a panel.

As discussed above, beam failure recovery is currently defined per serving cell but it does not consider the case where the SCell beam failure has been declared and it has no uplink to indicate the failure in SCell and the uplink control signaling is potentially transmitted on PCell uplink (i.e., SCell PUCCH).

Some example embodiments may assume a situation where SCell beam failure has been declared (but PCell or SCell with working uplink associated with the failed SCell is not in failure condition) and a new candidate beam or beams exists on SCell, and the UE has indicated the beam(s) to the network using uplink preamble signaling or MAC CE. With MAC CE, a UE may report, for example, N-best candidates according to network configuration.

Thus, one example embodiment provides methods for a UE to determine spatial QCL assumption for the PDCCH reception when SCell beam failure has occurred. In some examples discussed herein, it may be assumed that the UE operates with one active panel at a time and TXRU per serving cell, i.e., M=1.

Certain embodiments provide the following options for logic for setting the UE spatial Rx filter (RX beam alignment) on SCell with spatial QCL assumption for PDCCH DMRS of specific candidate DL RS when it has indicated more than one candidate beam RS (CSI-RS resource indexes and/or SSB resource/time location indexes) to the network. In a first option, if the UE has indicated N-candidates (SSB/CSI-RS), the UE may set the spatial Rx filter with assumption that the PDCCH DMRS of SCell are QCLed with the indicated DL RS with highest reported reporting quantity (RSRP, RSRQ etc.). In another option, if the UE has indicated only CSI-RS resources as new candidates, the UE may set the spatial Rx filter according to the highest reported CSI-RS. In yet another option, if the UE has indicated both CSI-RS and SSB as new candidates, the UE may set the spatial Rx filter assuming highest reported SSB due to link robustness. The network may then use the SSB link to activate, for example, one of the indicated candidate CSI-RS or alternative SS Block as active TCI state for PDCCH reception. The network may also configure new TCI states for PDSCH reception.

In one example embodiment, the spatial Rx filter setting at the UE may take into account the PDCCH TCI state table entries. For example, if a UE has indicated only CSI-RS as new candidates and at least one CSI-RS resource is currently configured as TCI state but is not active, the UE may set the spatial Rx filter according to the highest reported non-active TCI state. In another example, if a UE has indicated only SSB resources as new candidates, the UE may set the spatial Rx filter according to the highest reported SSB. In yet another example, if a UE has indicated only SSBs as new candidates and at least one CSI-RS resource is currently configured as TCI state but is not active, the UE may set the spatial Rx filter according to the highest reported non-active TCI state.

According to certain example embodiments, the network has the option to use SCell or PCell for transmitting the new PDCCH TCI state activation MAC CE since it knows the UE RX alignment through mutual agreement (either by configuration or through specification). This agreement avoids the panel activation delay in case the network indicates the assumed candidate as new TCI state. Also, the SCell signalling can be used to send MAC CE, which confirms that the link is operational, and MAC CE may be acknowledged using PCell.

In an embodiment, in case the network decides to activate a PDCCH TCI state that the UE has no alignment currently, i.e., the assumed alignment does not correspond to the new TCI state indicated by network, the network may use PCell downlink to signal the UE the new TCI state. In this case, the new TCI state activation may take into account the potential panel activation delay.

According to one example embodiment, for SCell CORESET, the indicated candidate beams may be implicitly assumed as new PDCCH TCI table and/or PDSCH TCI table upon activation of one of the indicated DL RS as a new TCI state until reconfigured by network. For example, the PDCCH/PDSCH TCI table may be populated in the order of which the indicated DL RS were listed in the MAC CE/UCI on PUSCH. This may be beneficial, for example, if the TCI table entries for SCell CORESET are flushed upon beam failure detection on SCell. In another example, if the TCI table entries are not removed upon beam failure, the indicated candidates may be added as new entries to the current TCI table (excluding already the same RS indexes that are included in the list).

In an additional example embodiment, if a UE is capable of operating with multiple panels and multiple TXRUs per serving cell/SCell (M-panels active with M TXRUs), the UE may select for example the spatial Rx filter with PDCCH DMRS QCL assumption according to M highest DL RS based on reporting quantity if M=<N. Or, if more than one SS block and more than one CSI-RS were indicated or more than one SS block and at least one CSI-RS or at least one SS Block and one CSI-RS were indicated, the UE may select at least one SS Block and at least one CSI-RS if the M>=2.

Figure 2A:
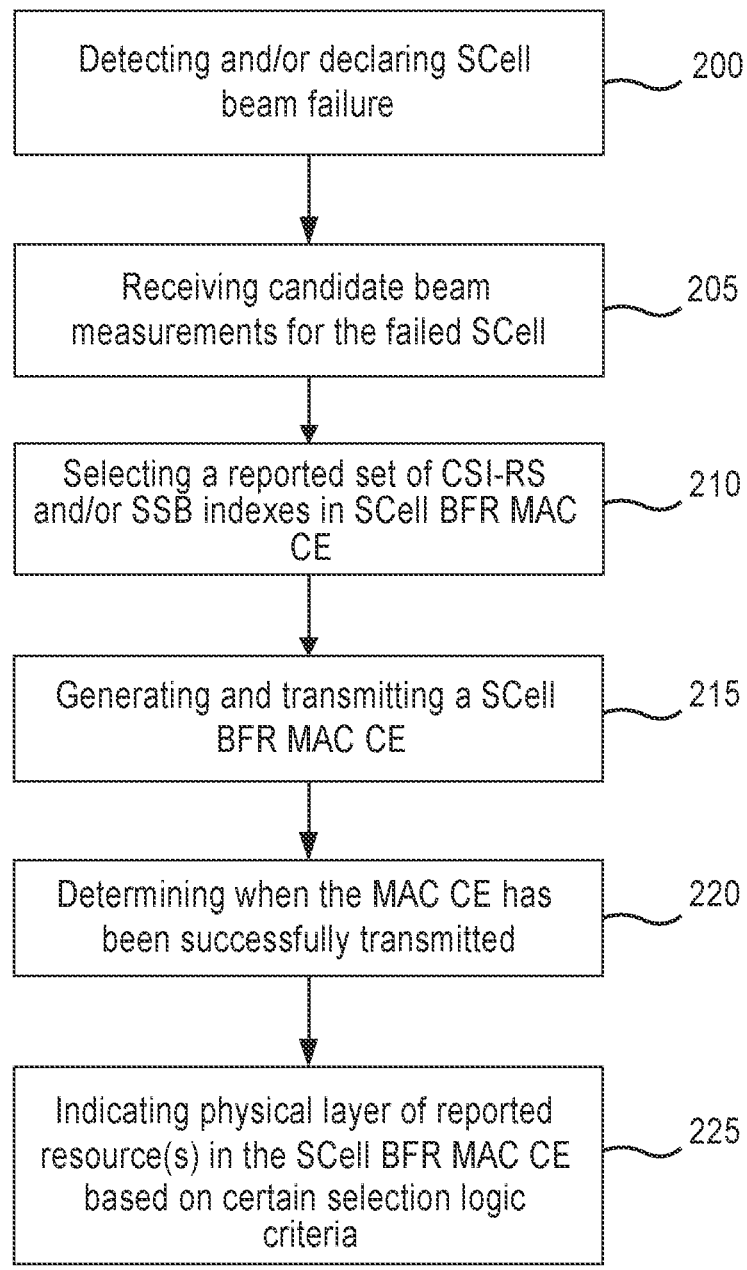
FIG. 2a illustrates an example flow diagram of a method, according to one embodiment.

FIG. 2a illustrates an example flow diagram of a method for receiver spatial filter configuration during SCell BFR, according to an embodiment. In certain embodiments, the method of FIG. 2a may be performed by a UE, mobile station, mobile equipment, IoT device, or the like. In some embodiments, the example method of FIG. 2a may assume that the resource selection for SCell candidates is on MAC layer (and included in MAC CE). As illustrated in the example of FIG. 2a, the method may include, at 200, detecting and/or declaring SCell beam failure at MAC layer. In an embodiment, the method may also include, at 205, requesting and/or receiving candidate beam measurements from the physical layer (L1) for the failed SCell. According to one embodiment, the method may further include, at 210, determining and/or selecting a reported set of CSI-RS and/or SSB indexes in SCell BFR MAC CE according to the network configuration (i.e., N-highest). The method may then include, at 215, generating and transmitting a SCell BFR MAC CE and, at 220, determining when the MAC CE has been successfully transmitted.

In certain embodiments, the method may also include, at 225, indicating physical layer of at least one reported resource in the SCell BFR MAC CE, where the indication is based on the selection logic criteria discussed in detail above. For example, if the UE has indicated N-candidates (SSB/CSI-RS), the indicating 225 may include setting the spatial Rx filter with assumption that the PDCCH DMRS of SCell are QCLed with the indicated DL RS with highest reported reporting quantity (RSRP, RSRQ etc.). In another option, if the UE has indicated only CSI-RS resources as new candidates, the indicating 225 may include setting the spatial Rx filter according to the highest reported CSI-RS. In yet another option, if the UE has indicated both CSI-RS and SSB as new candidates, the indicating 225 may include setting the spatial Rx filter assuming highest reported SSB due to link robustness. The network may then use the SSB link to activate the indicated CSI-RS as active TCI state.

According to one example, the setting of the spatial Rx filter may take into account the PDCCH TCI state table entries. For example, if the UE has indicated only CSI-RS as new candidates and at least one CSI-RS resource is currently configured as TCI state but is not active, the setting may include setting the spatial Rx filter according to the highest reported non-active TCI state. In another example, if the UE has indicated only SSB resources as new candidates, the setting may include setting the spatial Rx filter according to the highest reported SSB. In yet another example, if the UE has indicated only SSBs as new candidates and at least one CSI-RS resource is currently configured as TCI state but is not active, the setting may include setting the spatial Rx filter according to the highest reported non-active TCI state.

In another example embodiment, if the UE is capable of operating with multiple panels and multiple TXRUs per serving cell/SCell (M-panels active with M TXRUs), the setting may include selecting, for example, the spatial Rx filter with PDCCH DMRS QCL assumption according to M highest DL RS based on reporting quantity. Or, if more than one SS block and more than one CSI-RS were indicated or more than one SS block and at least one CSI-RS or at least one SS Block and one CSI-RS were indicated, the selecting may include selecting at least one SS Block and at least one CSI-RS if the M>=2.

Figure 2B:
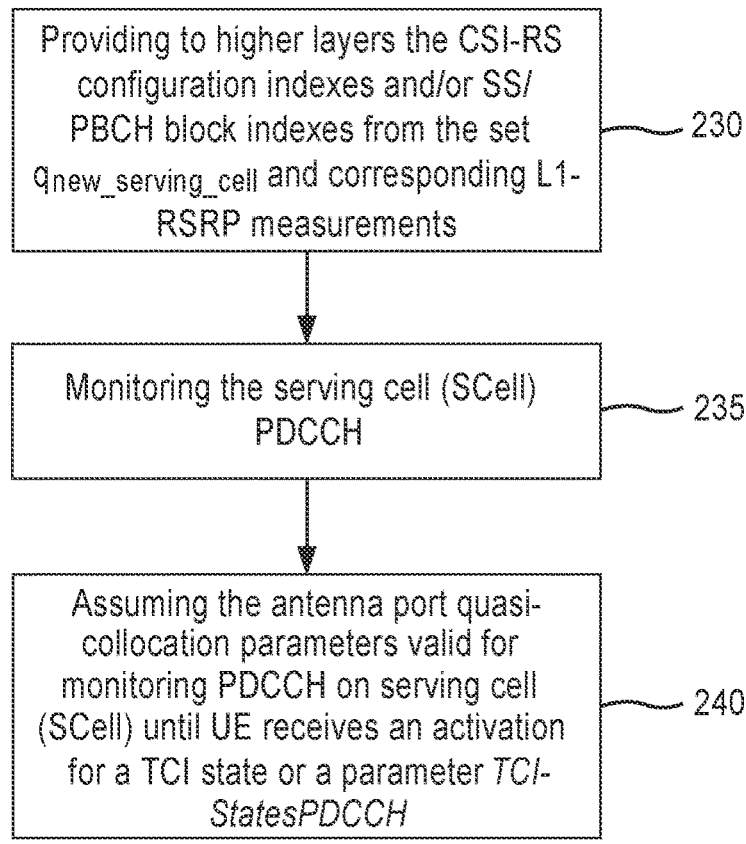
FIG. 2b illustrates an example flow diagram of a method, according to another embodiment.

FIG. 2b illustrates an example flow diagram of a method for link reconfiguration, according to one embodiment. In certain embodiments, the method of FIG. 2b may be performed by a UE, mobile station, mobile equipment, IoT device, or the like. As illustrated in the example of FIG. 2b, the method may include, upon request from higher layers, for each requested serving cell, at 230, the UE providing to higher layers the (periodic) CSI-RS configuration indexes and/or SS/PBCH block indexes from the set $q_{new\_serving\_cell}$ and the corresponding L1-RSRP measurements on resources (a) that are larger than or equal to $Q_{in,LR\_Scell}$ (i.e., RSRP threshold), (b) all the measurements or N-highest CSI-RS and or SS/PBCH block indexes and L1-RSRP, or (c) that are below or equal to $Q_{in}$ (i.e., hypothetical PDCCH BLER threshold for In-sync condition e.g. 2%).

If the UE is indicated by higher layer one or more selected periodic CSI-RS resource or SS/PBCH block index from the provided set of $q_{new\_serving\_cell}$, monitoring, at 235, the serving cell (SCell) PDCCH for reception of a DCI (format 0) with CRC scrambled by (SCell) C-RNTI starting from a next slot after receiving the resource indication from higher layer with assumption that the DM-RS antenna port associated with PDCCH reception in the UE-specific search space is quasi co-located with selected (by higher layer) periodic CSI-RS resource or SS/PBCH block index with respect to delay spread, Doppler spread, Doppler shift, average delay, and/or spatial Rx parameters, when applicable. Otherwise, and before the higher layer indication, monitoring, at 235, PDCCH with quasi co-location assumption prior to the beam failure. In an embodiment, the method may then include, at 240, assuming the antenna port quasi-collocation parameters valid for monitoring PDCCH on serving cell (SCell) until the UE receives by higher layers an activation for a TCI state or a parameter TCI-StatesPDCCH. For PDSCH reception, the method may include the UE assuming the same antenna port quasi-collocation parameters as for monitoring PDCCH until the UE receives by higher layers an activation for a TCI state or a parameter TCI-StatesPDCCH.

Figure 2C:
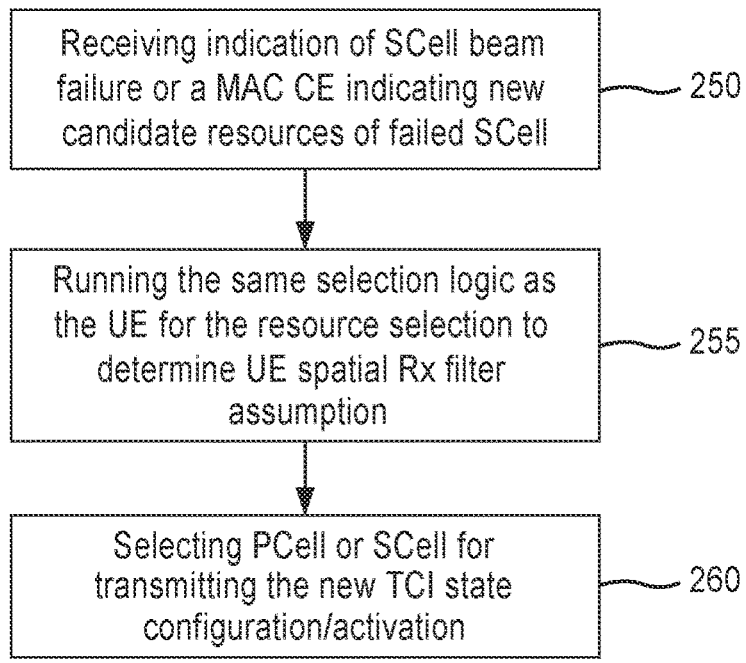
FIG. 2c illustrates an example flow diagram of a method, according to another embodiment.

FIG. 2c illustrates an example flow diagram of a method for spatial filter configuration during SCell BFR, according to one embodiment. In certain embodiments, the flow diagram of FIG. 2c may be performed by a network node, such as a base station, node B, eNB, gNB, or any other access node. As illustrated in the example of FIG. 2c, the method may include, at 250, receiving an indication of SCell (or serving cell) beam failure or alternatively a MAC CE indicating new candidate resources of failed SCell. Upon receiving the SCell BFR MAC CE, the method may include, at 255, running the same selection logic as the UE for the resource selection to determine UE spatial Rx filter assumption for receiving a gNB response for the BFR on SCell (TCI state configuration). The method may then include, at 260, selecting PCell or SCell for transmitting the new TCI state configuration/activation.

Figure 3A:
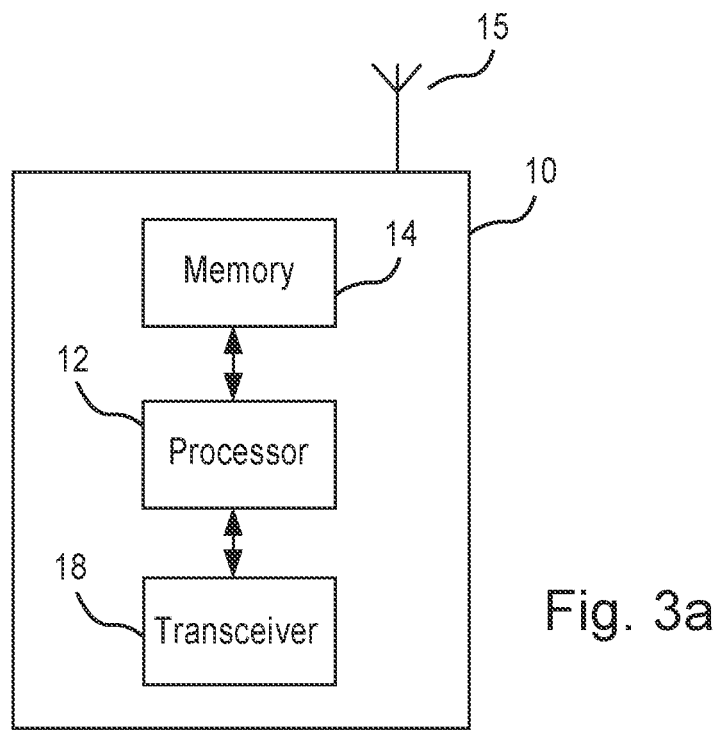
FIG. 3a illustrates an example block diagram of an apparatus, according to one embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagram illustrated in FIG. 2a, 2b, or 2c. For example, in certain embodiments, apparatus 10 may be controlled by memory 14 and processor 12 to perform one or more of the steps illustrated in FIG. 2c. In certain embodiments, apparatus 10 may be configured to perform a procedure for receiver spatial filter configuration during SCell BFR.

For instance, in one embodiment, apparatus 10 may be controlled by memory 14 and processor 12 to receive an indication of SCell (or serving cell) beam failure indication or alternatively a MAC CE indicating new candidate resources of failed SCell. Upon receiving the SCell BFR MAC CE, apparatus 10 may be controlled by memory 14 and processor 12 to run the same selection logic as the UE (e.g., the logic as discussed in connection with FIG. 2a) for the resource selection to determine UE spatial Rx filter assumption for receiving a gNB response for the BFR on SCell (TCI state configuration). In one embodiment, apparatus 10 may then be controlled by memory 14 and processor 12 to select PCell or SCell for transmitting the new TCI state configuration/activation.

Figure 3B:
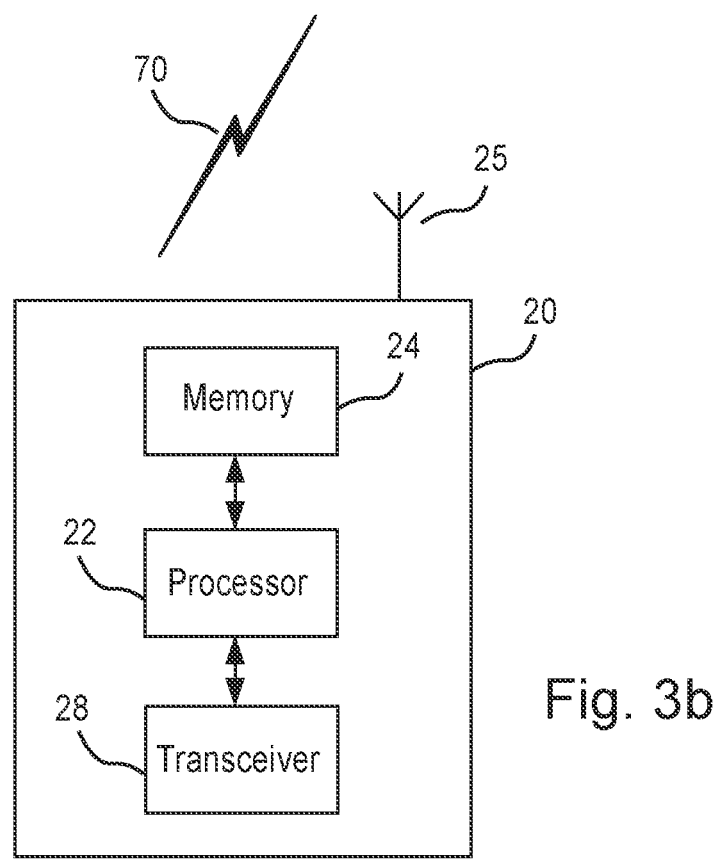
FIG. 3b illustrates an example block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 2a, 2b, or 2c. For example, in certain embodiments, apparatus 20 may be configured to perform a procedure for receiver spatial filter configuration during SCell BFR. Some embodiments may assume that the resource selection for SCell candidates is on MAC layer (and included in MAC CE).

According to some embodiments, apparatus 20 may be controlled by memory 24 and processor 22 to detect and/or declare SCell beam failure at MAC layer. In an embodiment, apparatus 20 may be controlled by memory 24 and processor 22 to request and/or receive candidate beam measurements from the physical layer (L1) for the failed SCell. According to one embodiment, apparatus 20 may be controlled by memory 24 and processor 22 to determine and/or select a reported set of CSI-RS and/or SSB indexes in SCell BFR MAC CE according to the network configuration (i.e., N-highest). In an embodiment, apparatus 20 may be controlled by memory 24 and processor 22 to generate and transmit a SCell BFR MAC CE, and to determine when the MAC CE has been successfully transmitted.

In certain embodiments, apparatus 20 may be controlled by memory 24 and processor 22 to indicate physical layer of at least one reported resource in the SCell BFR MAC CE, where the indication is based on the selection logic discussed in detail above. For example, if apparatus 20 has indicated N-candidates (SSB/CSI-RS), apparatus 20 may be controlled by memory 24 and processor 22 to set the spatial Rx filter with assumption that the PDCCH DMRS of SCell are QCLed with the indicated DL RS with highest reported reporting quantity (RSRP, RSRQ etc.). In another option, if apparatus 20 has indicated only CSI-RS resources as new candidates, apparatus 20 may be controlled by memory 24 and processor 22 to set the spatial Rx filter according to the highest reported CSI-RS. In yet another option, if apparatus 20 has indicated both CSI-RS and SSB as new candidates, apparatus 20 may be controlled by memory 24 and processor 22 to set the spatial Rx filter assuming highest reported SSB due to link robustness. The network may then use the SSB link to activate the indicated CSI-RS as active TCI state.

According to one example, apparatus 20 may be controlled by memory 24 and processor 22 to take into account the PDCCH TCI state table entries when setting the spatial Rx filter. For example, if apparatus 20 has indicated only CSI-RS as new candidates and at least one CSI-RS resource is currently configured as TCI state but is not active, apparatus 20 may be controlled by memory 24 and processor 22 to set the spatial Rx filter according to the highest reported non-active TCI state. In another example, if apparatus 20 has indicated only SSB resources as new candidates, apparatus 20 may be controlled by memory 24 and processor 22 to set the spatial Rx filter according to the highest reported SSB. In yet another example, if apparatus 20 has indicated only SSBs as new candidates and at least one CSI-RS resource is currently configured as TCI state but is not active, apparatus 20 may be controlled by memory 24 and processor 22 to set the spatial Rx filter according to the highest reported non-active TCI state.

In another example embodiment, if apparatus 20 is capable of operating with multiple panels and multiple TXRUs per serving cell/SCell (M-panels active with M TXRUs), apparatus 20 may be controlled by memory 24 and processor 22 to select, for example, the spatial Rx filter with PDCCH DMRS QCL assumption according to M highest DL RS based on reporting quantity. Or, if more than one SS block and more than one CSI-RS were indicated or more than one SS block and at least one CSI-RS or at least one SS Block and one CSI-RS were indicated, apparatus 20 may be controlled by memory 24 and processor 22 to select at least one SS Block and at least one CSI-RS if the M>=2.

According to another embodiment, apparatus 20 may be configured to perform a method for link reconfiguration. In certain embodiments, apparatus 20 may be controlled by memory 24 and processor 22 to, upon request from higher layers, for each requested serving cell, provide to higher layers the (periodic) CSI-RS configuration indexes and/or SS/PBCH block indexes from the set $q_{new\_serving\_cell}$ and the corresponding L1-RSRP measurements on resources (a) that are larger than or equal to $Q_{in,LR\_Scell}$ (i.e. RSRP threshold), (b) all the measurements or N-highest CSI-RS and or SS/PBCH block indexes and L1-RSRP, or (c) that are below or equal to $Q_{in}$ (i.e., hypothetical PDCCH BLER threshold for In-sync condition e.g. 2%).

If apparatus 20 is indicated by higher layer one or more selected periodic CSI-RS resource or SS/PBCH block index from the provided set of $q_{new\_serving\_cell}$, apparatus 20 may be controlled by memory 24 and processor 22 to monitor the serving cell (SCell) PDCCH for reception of a DCI (format 0) with CRC scrambled by (SCell) C-RNTI starting from a next slot after receiving the resource indication from higher layer with assumption that the DM-RS antenna port associated with PDCCH reception in the UE-specific search space is quasi co-located with selected (by higher layer) periodic CSI-RS resource or SS/PBCH block index with respect to delay spread, Doppler spread, Doppler shift, average delay, and/or spatial Rx parameters, when applicable. Otherwise, and before the higher layer indication, apparatus 20 may be controlled by memory 24 and processor 22 to monitor PDCCH with quasi co-location assumption prior to the beam failure. In an embodiment, apparatus 20 may be controlled by memory 24 and processor 22 to assume the antenna port quasi-collocation parameters valid for monitoring PDCCH on serving cell (SCell) until the UE receives by higher layers an activation for a TCI state or a parameter TCI-StatesPDCCH (a list of TCI states). For PDSCH reception, apparatus 20 may be controlled by memory 24 and processor 22 to assume the same antenna port quasi-collocation parameters as for monitoring PDCCH until the UE receives by higher layers an activation for a TCI state or a parameter TCI-StatesPDCCH.

Therefore, certain example embodiments provide several technical improvements, enhancements, and/or advantages. Various example embodiments can, for example, provide ways to recover from beam failure in cases where the SCell beam failure has been detected while the PCell is not in a failure condition. Thus, some example embodiments provide a solution for beam failure recovery in a situation that was not previously adequately addressed. Consequently, certain example embodiments improve the reliability and speed of networks. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

The invention claimed is:

1. A method, comprising:
   detecting, by a user equipment, secondary cell (SCell) beam failure at a medium access control layer;
   receiving candidate beam measurements from a physical layer for the failed SCell;
   determining a reported set of at least one of channel state information reference signals or synchronization signal block indexes in a SCell beam failure recovery medium access control control element according to a network configuration;
   indicating to the physical layer at least one reported resource in the SCell beam failure recovery medium access control control element, wherein the indicating is based on certain selection criteria on the determined indexes;
   generating and transmitting the SCell beam failure recovery medium access control control element;
   determining when the SCell beam failure recovery medium access control control element has been successfully transmitted;
   setting, by the user equipment, a spatial receiver filter, wherein the setting is based on the indicated at least one reported resource;
   wherein, when the at least one reported resource indicated to the physical layer comprises a plurality of reported resources, the setting comprises setting the spatial receiver filter with an assumption that physical downlink control channel demodulation reference signals of the SCell are quasi co-located with a downlink reference signal having a highest reported reporting quantity;
   wherein, when the at least one reported resource indicated to the physical layer consists of channel state information reference signals, the setting comprises setting the spatial receiver filter according to a channel state information reference signal having a highest reported reporting quantity; and
   wherein, when the at least one reported resource indicated to the physical layer comprises at least one channel state information reference signal and at least one synchronization signal block, the setting comprises setting the spatial receiver filter assuming a synchronization signal block having a highest reported reporting quantity.

2. The method according to claim 1, wherein the determining the reported set of indexes is based on certain selection criteria on the received candidate beam measurements.

3. The method according to claim 1, wherein the setting of the spatial receiver filter takes into account physical downlink control channel transmission configuration indication state table entries.

4. The method according to claim 1, wherein, when the user equipment is capable of operating with multiple panels and multiple transceiver units per serving SCell, the setting comprises selecting the spatial receiver filter with an assumption that physical downlink control channel demodulation reference signals are quasi co-located with a plurality of downlink reference signals having highest reported reporting quantities.

5. The method according to claim 4, wherein, when the reported resources consist of more than one synchronization signal block and at least one channel state information reference signal or when the reported resources consist of at least one synchronization signal block and one channel state information reference signal, the setting comprises selecting at least one synchronization signal block and at least one channel state information reference signal.

6. An apparatus, comprising:
at least one processor; and
at least one memory comprising computer program code,
the at least one memory and computer program code configured, with the at least one processor, to cause the apparatus at least to
detect secondary cell (SCell) beam failure at a medium access control layer;
receive candidate beam measurements from a physical layer for the failed SCell;
determine a reported set of channel state information reference signals and/or synchronization signal block indexes in a SCell beam failure recovery medium access control control element according to a network configuration;
indicate to the physical layer at least one reported resource in the SCell beam failure recovery medium access control control element, wherein the indicating is based on certain selection criteria on the determined indexes;
generate and transmit the SCell beam failure recovery medium access control control element;
determine when the SCell beam failure recovery medium access control control element has been successfully transmitted;
set a spatial receiver filter, wherein the setting is based on the indicated reported resources;
wherein, when the at least one reported resource indicated to the physical layer comprises a plurality of reported resources, the at least one memory and computer program code are further configured, with the at least one processor, to cause the apparatus at least to set the spatial receiver filter with an assumption that physical downlink control channel demodulation reference signals of the SCell are quasi co-located with a downlink reference signal having a highest reported reporting quantity;
wherein, when the at least one reported resource indicated to the physical layer consists of channel state information reference signals, the at least one memory and computer program code are further configured, with the at least one processor, to cause the apparatus at least to set the spatial receiver filter according to a channel state information reference signal having a highest reported reporting quantity; and
wherein, when the at least one reported resource indicated to the physical layer comprises at least one channel state information reference signal and at least one synchronization signal block, the at least one memory and computer program code are further configured, with the at least one processor, to cause the apparatus at least to set the spatial receiver filter assuming a synchronization signal block having a highest reported reporting quantity.

7. The apparatus according to claim 6, wherein the determining the reported set of indexes is based on certain selection criteria on the received candidate beam measurements.

8. The apparatus according to claim 6, wherein the setting of the spatial receiver filter takes into account physical downlink control channel transmission configuration indication state table entries.

9. The apparatus according to claim 6, wherein, when the apparatus is capable of operating with multiple panels and multiple transceiver units per serving SCell, the at least one memory and computer program code are further configured, with the at least one processor, to cause the apparatus at least to select the spatial receiver filter with an assumption that physical downlink control channel demodulation reference signals are quasi co-located with a plurality of downlink reference signals having highest reported reporting quantities.

10. The apparatus according to claim 9, wherein, when the reported resources consist of more than one synchronization signal block and at least one channel state information reference signal or when the reported resources consist of at least one synchronization signal block and one channel state information reference signal, the setting caused by the at least one memory and computer program code, with the at least one processor, further comprises selecting at least one synchronization signal block and at least one channel state information reference signal.

* * * * *